United States Patent [19]

Kobayashi

[11] Patent Number: 6,151,283

[45] Date of Patent: Nov. 21, 2000

[54] LENS CLEANER FOR A DISC UNIT

[76] Inventor: Asao Kobayashi, 243-5, Kamiiida-cho, Izumi-ku, Yokohama-city, Kanagawa, Japan

[21] Appl. No.: 09/266,593

[22] Filed: Mar. 11, 1999

[30]    Foreign Application Priority Data

Nov. 19, 1998  [JP]  Japan .................................. 10-009167

[51] Int. Cl.$^7$ ...................................................... G11B 3/58
[52] U.S. Cl. .............................................................. 369/71
[58] Field of Search ............................... 369/71, 72, 77.1, 369/77.2, 75.1; 360/99.06, 97.02; 361/384

[56]    References Cited

U.S. PATENT DOCUMENTS

| | | | |
|---|---|---|---|
| 5,088,083 | 2/1992 | Olson ......................................... | 369/71 |
| 5,144,611 | 9/1992 | Engler et al. ............................. | 369/71 |
| 5,245,601 | 9/1993 | Hake ......................................... | 369/72 |
| 5,255,256 | 10/1993 | Engler et al. .......................... | 369/99.06 |
| 5,303,220 | 4/1994 | Whitaker et al. ......................... | 369/71 |
| 5,739,980 | 4/1998 | Brooks ................................... | 360/97.03 |
| 6,028,830 | 2/2000 | Fritsch et al. .............................. | 369/71 |

*Primary Examiner*—Hoa T. Nguyen
*Assistant Examiner*—Tianjie Chen
*Attorney, Agent, or Firm*—Sughrue, Mion, Zinn, Macpeak & Seas, PLLC

[57]    ABSTRACT

In a conventional lens cleaner for a disk unit, dust is removed by bringing planted brushing hair bundles or projections into contact with a lens, and thus a large quantity of planted brushing hair bundles or projections may impede insertion and removal of the disc from the disc unit, or may cause flaws on the lens. A lens cleaner for a disc unit in the present device comprises a cleaning disc in the identical configuration with the disc and at least a through hole, wherein dust is removed by applying the air flow generated through the through hole during the rotation of the disc onto the lens.

4 Claims, 3 Drawing Sheets

LENS CLEANER FOR A DISC UNIT

BACKGROUND OF THE INVENTION

1. Field of the Device

The present utility model relates to a lens cleaner for a disc unit, and more particularly relates to novel improvements for removing dust or the like attached on the lens by applying the air flow generated through a through hole formed on a cleaning disc onto the lens.

2. Description of the Related Art

In conventionally used lens cleaners for a disc unit of this kind, a construction shown in FIG. 1 and FIG. 2 has been employed. The reference numeral 1 shown in FIG. 1 represents a cleaning disc formed in identical configuration with any one of a compact disc (CD), a mini disc (MD), a compact disc-recordable (CD-R), and a digital video disc (DVD), which are commercially available. In the case of a compact disc, the thickness thereof is standardized to the value from 1.2 mm+0.3 to 1.2 mm−0.1. On the surface of the cleaning disc 1a facing the lens, there is provided with planted brushing hair bundles 2 which are so constructed as to be brought into contact with a lens 4 of an optical pick-up 3.

Therefore, by installing this cleaning disc 1 into a disc unit, not shown, instead of a compact disc, the lens 4 will be cleaned by the planted brushing hair bundles.

A conventional lens cleaner for a disc unit is so arranged as described above, the following problems exist.

Due to planted brushing hair bundles (or rubbery column-shaped projections in some cases) projecting by a few millimeters, there are cases where the cleaning disc is refused before insertion or rejected after insertion as an off-spec product, or sometimes it cannot be removed.

If planted brushing hair bundles are contaminated, the lens may be contaminated by contraries, or what is worse, the lens may be damaged. When planted brushing hair bundles are used in wet condition, the user may apply too much solvent, and thus the lens may be partly tarnished or tainted with dust or the like attached thereon. In addition, the usage of the cleaning disc having such planted brushing hair bundles or projections is limited in number of times due to deterioration thereof.

SUMMARY OF THE INVENTION

Accordingly, it is an object of the present device to solve the above-described problems and particularly to provide a lens cleaner for a disc unit which is so constructed that dust or the like attached on the lens can be removed by applying the air flow generated through a through hole formed on a cleaning disc.

The lens cleaner for a disc unit according to the present device is an air cleaner for cleaning the lens of the disc unit for at least regenerating or reading information on the disc by means of a optical pick-up having a lens comprising a cleaning disc having an identical configuration with the disc and a through hole formed on the cleaning disc, wherein the air flow generated through the through hole during the rotation of the cleaning disc is directed to the lens, the through hole defines a tapered surface, a first diameter of a first opening of the through hole on the side facing the lens is smaller than a second diameter of a second opening thereof on the opposite side thereof, the periphery of the second opening is provided with a projection, and the through hole is located on a line extending in radial direction on the side of the second opening.

DESCRIPTION OF THE PREFERRED EMBODIMENTS

Figure 1:
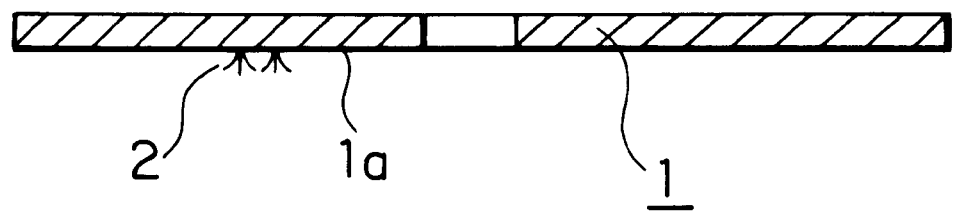
FIG. 1 is a cross-sectional view of a conventional cleaning disc.
Figure 2:
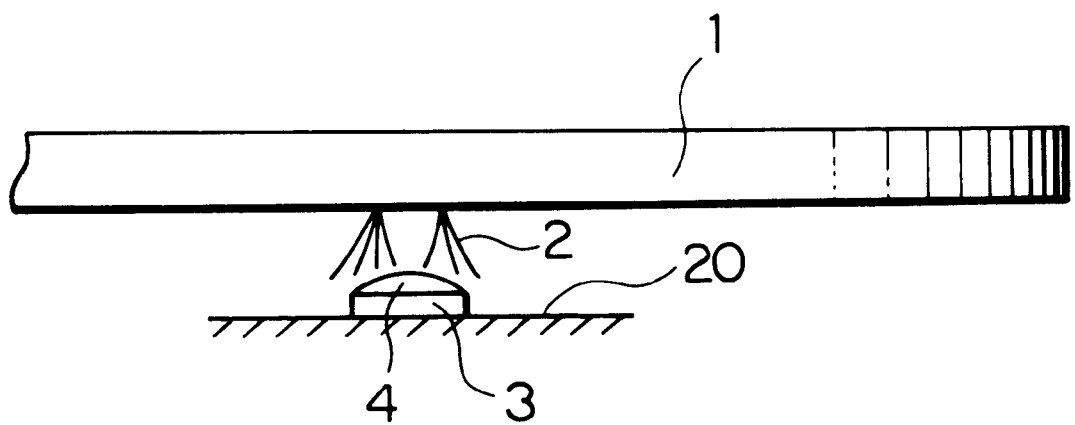
FIG. 2 is a cross-sectional view of a conventional cleaning disc illustrating the arrangement thereof.

Referring now to the drawings, there is shown preferred embodiments of a lens cleaner for a disc unit of the present device, wherein like reference characters designate like or corresponding parts to an example of related art.

Figure 3:
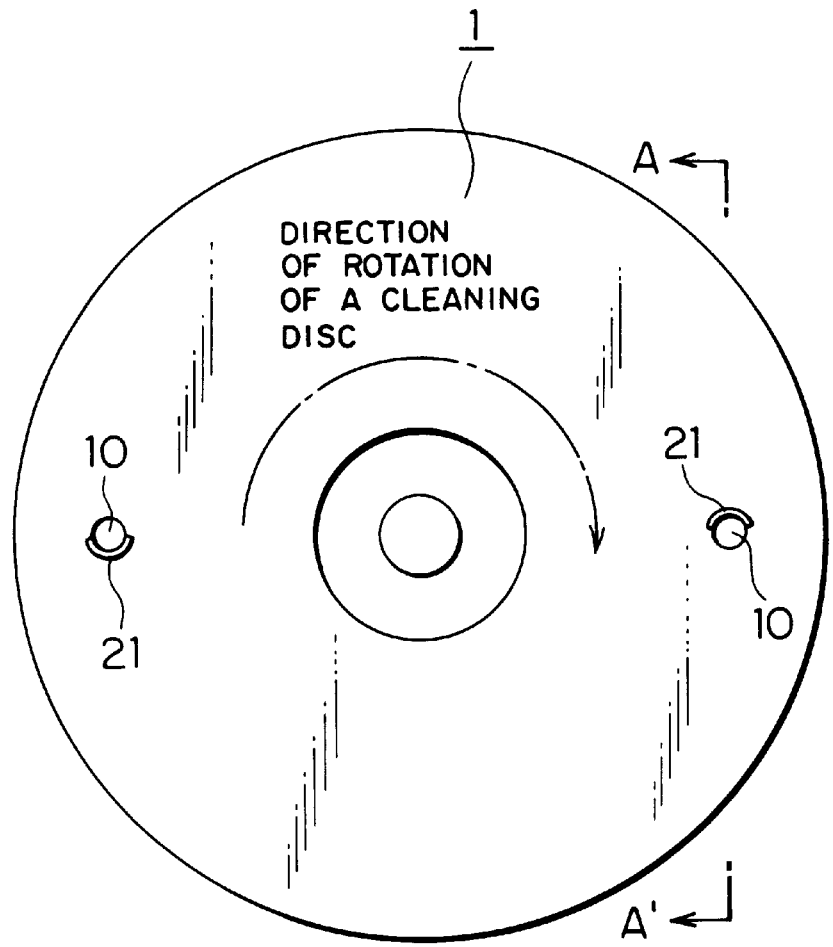
FIG. 3 is a plan view showing a lens cleaner for a disc unit according to the present device.

In FIG. 3, reference numeral 1 represents a cleaning disc formed in the identical configuration with any one of a compact disc, a mini disc, a compact disc-recordable, a digital video disc, and so on which are all commercially available. The cleaning disc 1 may be removably inserted into a disc unit, not shown, for a commercially available discs for music, videos or computers, and may be at least regenaratable or readable, and sometimes may be recordable and regeneratable, i.e., information can be read therefrom or write thereon.

Figure 4:
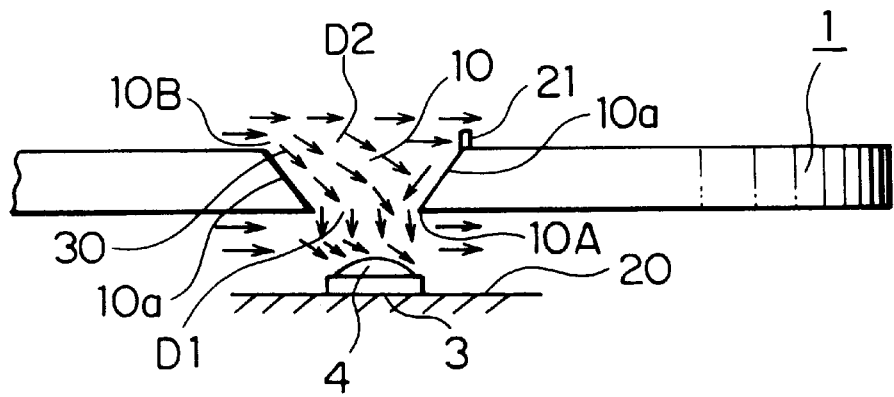
FIG. 4 is a cross-sectional view taken along the line A—A in FIG. 3.

The cleaning disc 1 is provided with a single or a plurality of holes 10 standing radially off to the periphery thereof, and each of which, when there are two holes making a pair, is formed at an angle of 180 degrees relative to each other. The through hole 10 is constructed as shown in FIG. 4. Accordingly, the side wall of the through hole 10 defines a tapering surface 10a, and a unit 20 is provided with a optical pick-up 3 having a lens 4 on the opposite side (below in the figure) thereof. The through holes 10 are so located as to lie on a line extending in the radial direction of the disc 1.

A first diameter D1 of the first opening 10A of the through hole 10 on the side facing the lens 4 is smaller than a second diameter D2 of a second opening 10B thereof on the opposite side, and thus the shape of the through hole 10 is like a funnel tapering toward the lens 4. Although there is shown an optical pick-up 3 disposed below the cleaning disc 1 in FIG. 4, not only the construction such that the disc 1 is inserted horizontally into the disc unit, but also the construction such that the disc 1 is inserted vertically thereto is employed.

On the edge portion of the second opening 10B of the through hole 10, there is provided a projection 21 in a shape of semi-cylinder or a wall at a small height (to the extent that it does not impede insertion or removal of the disc) along the direction of axis of the through hole 10.

Figure 5:
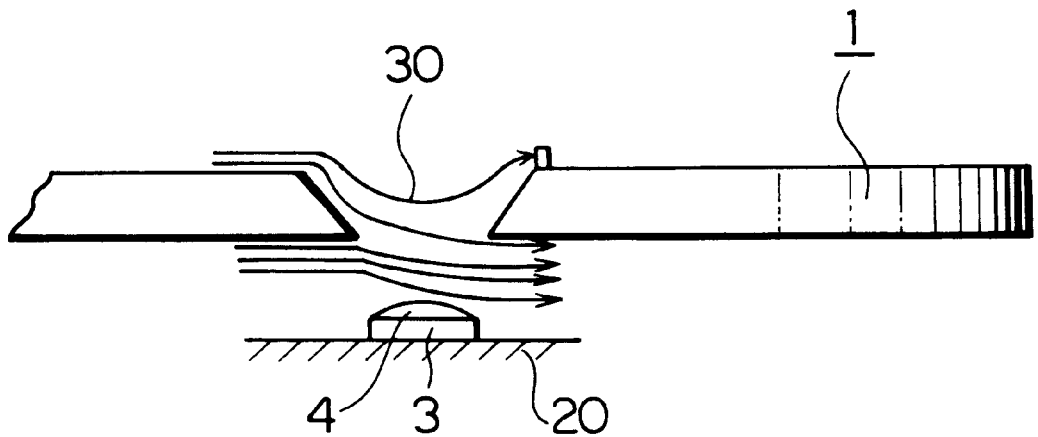
FIG. 5 is an explanatory drawing illustrating the air flow in the arrangement shown in FIG. 4.

Referring now to the action thereof, when the cleaning disc is inserted into a disc unit (not shown) for music, videos, computers and so on instead of various discs for normal use, the cleaning disc 1 rotates at a high speed and thus the air flow 30 generated thereby flows directly or via projection 21 into the through hole 10 and onto the lens 4 of a optical pick-up 3 as shown in FIG. 4 and FIG. 5, and blows dust or the like attached on the lens 4 away. Since the cleaning disc 1 is rotating at high speed, the air flow 30 applied onto the lens 4 as shown in FIG. 4 and FIG. 5 is generated continuously.

As a result of an experiment, the effect of cleaning was satisfactory even without the projection 21, and of course, it was more effective when employing the projection 21.

Figure 6:
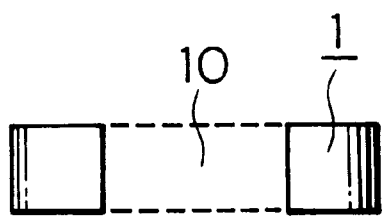
FIG. 6 is a cross-sectional view illustrating another embodiment of the through hole shown in FIG. 4.
Figure 7:
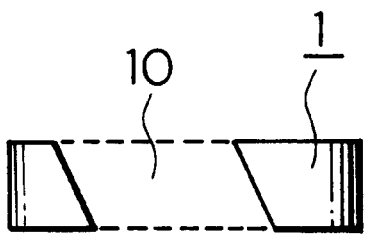
FIG. 7 is a cross-sectional view illustrating still another embodiment of the through hole shown in FIG. 4.
Figure 8:
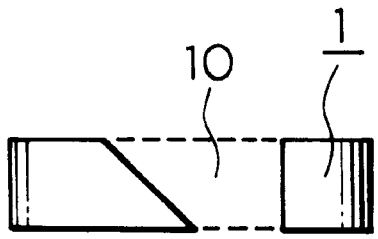
FIG. 8 is a cross-sectional view illustrating still another embodiment of the through hole shown in FIG. 4.

The through hole 10 was effective when it was formed in the configuration shown in FIG. 6 through FIG. 8, and also when the contour of the opening of the through hole was, for example, a square other than a circle. Although there are provided a pair of through holes on a disc in this embodiment, it is also possible to provide more than two through holes thereon.

In this arrangement, the lens cleaner for a disc unit according to the present device provides the following effects.

Since the present device is constructed in such a manner that a cleaning disc having through a hole or holes thereon is inserted into a disc unit instead of a disc for normal use, and lens is cleaned by the air flow generated through these through holes, difficulties in insertion or removal of the a cleaning disc as is in related art may be avoided.

In addition, in the conventional construction, the lens could be contaminated by the contamination of the brush itself. However, in the present device, a brush is not provided on the cleaning disc, the lens is cleaned by the air flow, and thus this problem may be solved as well.

Further, in the conventional construction, the limit of usage is specified because the brush may be worn or deformed after some period of use. However, in the present device, the air flow is used for cleaning instead of a brush, so that the disc may be used semipermanently, which may decrease the quantity of used disc to be dumped and thus may lead to the solution of the environmental problems in the future.

What is claimed is:

1. A lens cleaner for a disc unit that regenerates or reads information on an information disc by an optical pick-up having a lens, the lens cleaner comprising:

a cleaning disc; and a through hole formed on the cleaning disc;

wherein an air flow generated through the through hole during rotation of the cleaning disc is directed to the lens; and wherein a brush is not provided on a side of the cleaning disc facing the lens.

2. The lens cleaner for a disc unit of claim 1, wherein the through hole has (1) a first opening on the side of the cleaning disc facing the lens, and (2) a second opening on an opposite side of the cleaning disc; and wherein a first diameter of the first opening is smaller than a second diameter of the second opening, such that the through hole tapers from the first opening to the second opening.

3. The lens cleaner for a disc unit of claim 1, wherein the through hole has (1) a first opening on the side of the cleaning disc facing the lens and (2) a second opening on an opposite side of the cleaning disc, and wherein a periphery of the second opening is provided with a projection.

4. The lens cleaner for a disc unit according to claim 1, wherein the through hole is located on a line radially extending from a center of the cleaning disk.

\* \* \* \* \*